April 26, 1932.  F. S. RUSHAY  1,855,530
ICE CREAM DIPPER
Filed May 4, 1931  2 Sheets-Sheet 1
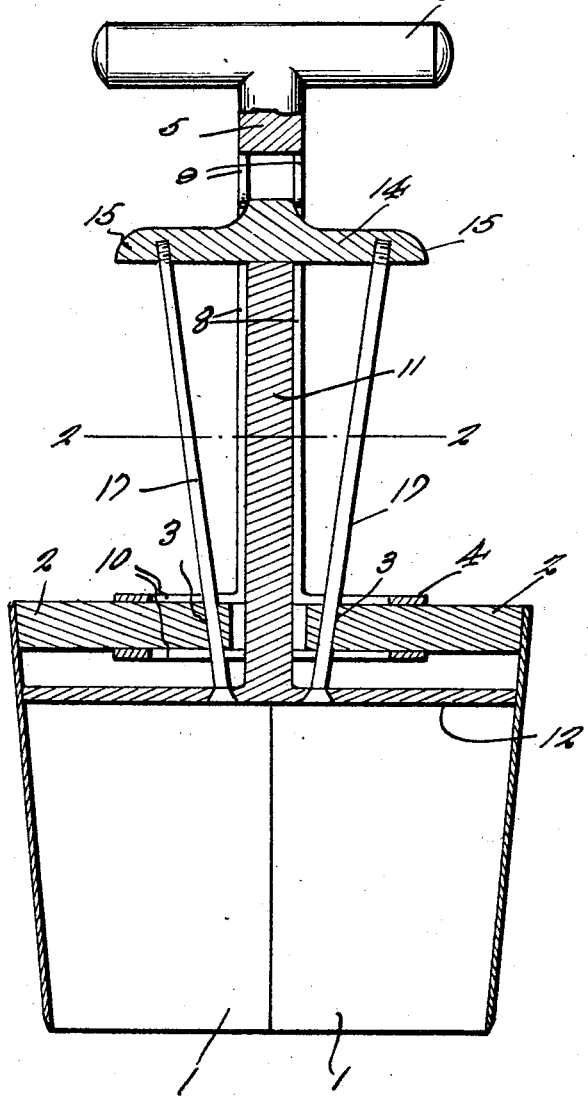
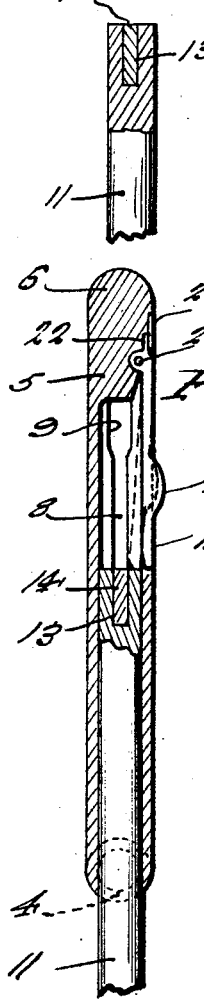
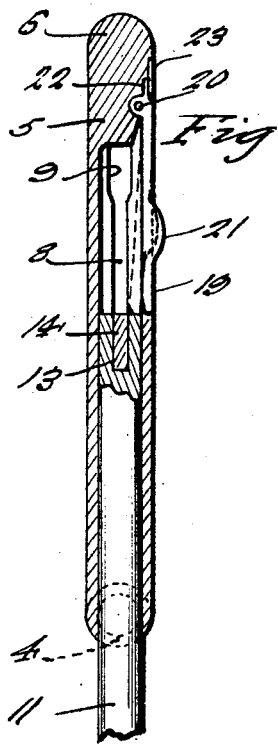
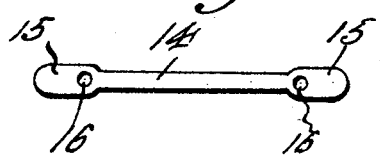
Inventor
Forest S. Rushay
By Clarence A. O'Brien
Attorney April 26, 1932.   F. S. RUSHAY   1,855,530
ICE CREAM DIPPER
Filed May 4, 1931   2 Sheets-Sheet 2
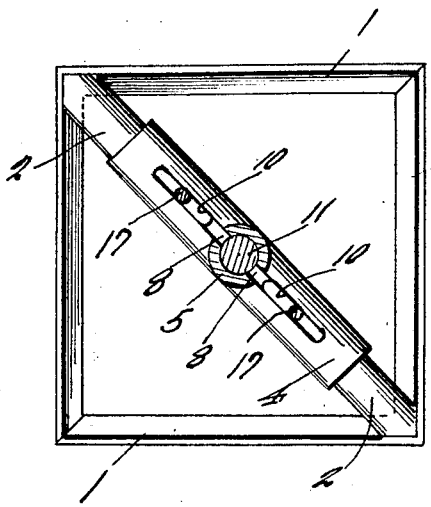
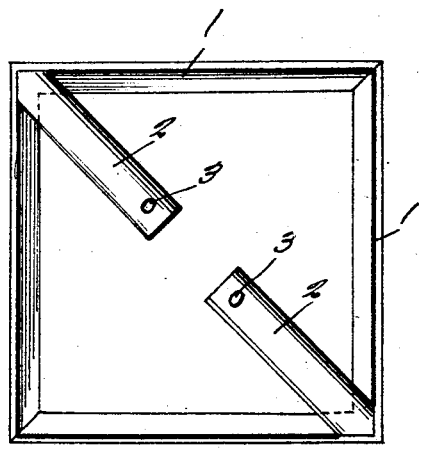
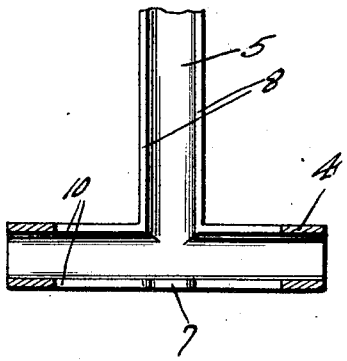
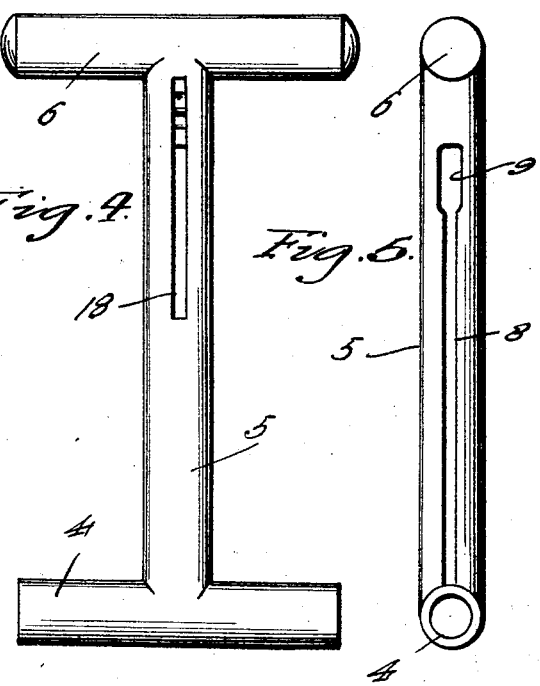
Inventor
Forest S. Rushay
By Clarence A. O'Brien
Attorney Patented Apr. 26, 1932

1,855,530

UNITED STATES PATENT OFFICE

FOREST S. RUSHAY, OF UTICA, OHIO

ICE CREAM DIPPER

Application filed May 4, 1931. Serial No. 534,980.

This invention relates to new and useful improvements in ice cream dippers and has for its primary object to provide, in a manner as hereinafter set forth, a device of this character embodying a novel construction and arrangement of parts whereby a predetermined quantity of ice cream may be expeditiously removed from a can or other container and deposited in a carton or the like.

Other important objects of the invention are to provide an ice cream dipper of the character described which will be comparatively simple in construction, strong, durable, efficient and reliable in use and which may be manufactured at low cost.

Still another important object of the invention is to provide an ice cream dipper of the character set forth embodying a construction and arrangement of parts whereby the same may be expeditiously assembled or disassembled and maintained in a sanitary condition at all times.

All of the foregoing and still further objects and advantages of the invention will become apparent from a study of the following specification, taken in connection with the accompanying drawings wherein like characters of reference designate corresponding parts throughout the several views, and wherein:

Figure 1 is a view principally in vertical section through an ice cream dipper constructed in accordance with the present invention.

Figure 2 is a horizontal sectional view taken substantially on the line 2—2 of Figure 1 looking downwardly.

Figure 3 is a detail view in top plan of the angular scoop plates showing the same in closed position.

Figure 4 is a detail view in front elevation of the supporting means for the scoop plates.

Figure 5 is a view in side elevation of the supporting means for the scoop plates taken at right angles to Figure 4.

Figure 6 is a fragmentary view in vertical section through the lower portion of the tube and the tubular cross head on the lower end thereof.

Figure 7 is a detail view in bottom plan of the portion of the device shown in Figure 6.

Figure 8 is a detail view showing a means for arresting the ejector plate at a predetermined point relative to the scoop plates when it is desired to measure a smaller quantity, such as a pint, of the ice cream.

Figure 9 is a fragmentary view principally in vertical section showing the means for mounting the ejector operating handle on the ejector or plunger rod.

Figure 10 is a detail view in bottom plan of the ejector handle.

Referring now to the drawings in detail, it will be seen that the reference numeral 1 designates a pair of complemental angular scoop plates which are adapted for disposition with their vertical edges in abutting engagement with each other and which are formed to define a downwardly tapering enclosure when in closed position, as illustrated to advantage in Figures 2 and 3 of the drawings. Secured to the upper ends of the scoop plates 1 at the angles thereof and extending inwardly therefrom are the arms 2 of circular cross section having in their inner end portions the upwardly diverging openings 3.

The arms 2 extend slidably into the end portions of a tubular cross head 4 which is disposed on the lower end of a stem 5 which is hollow from its lower end to a point adjacent its upper end, as best seen in Figure 1 of the drawings. A handle 6 is provided on the upper end of the stem 5. The bore of the stem 5 communicates with the bore of the cross head 4. The cross head 4 is provided with an opening 7 in its lower side which is aligned with the bore of the stem 5. The stem 5 is provided with diametrically opposite slots 8 which are enlarged at their upper ends, as at 9. The cross head 4 is provided with the oppositely disposed upper and lower slots 10 which terminate in spaced relation to the ends of the cross head. The slots 8 in the stem 5 communicate, at their lower ends, with the uppermost slot 10 in the cross head 4.

A plunger or ejector rod 11 is disposed for reciprocation in the stem 5 and extends slidably through the cross head 4 through the opening 7 therein and has mounted on its lower end an ejector plate 12 the marginal edges of which are disposed in sliding engagement with the inner surfaces of the scoop plates 1. The upper end portion of the plunger rod 11 is provided with a transverse slot 13 for the reception of the intermediate portion of a transversely disposed reciprocating handle 14 which is operable in the slots 8 of the stem 5. The reciprocating handle 14 is inserted through the enlargements 9 of the slots 8 for disposition on the plunger rod 11. The reciprocating handle 14 is provided with enlarged end portions 15 having inclined, threaded sockets 16 extending upwardly thereinto from the lower sides for the reception of the threaded upper end portions of the upwardly diverging rods 17 having headed lower ends countersunk and anchored in the ejector plate 12. The rods 17 pass slidably through the slots 10 of the cross head 4 and through the openings 3 in the arms 2 of the scoop plates 1, as illustrated to advantage in Figure 1 of the drawings.

The stem 5 is further provided with a comparatively short longitudinally extending slot 18 communicating with the upper portion of the bore of said stem. The slot 18 extends into the solid upper portion of the stem 5. A stop member 19 is pivotally mounted for swinging movement, as at 20, in the slot 18 and is provided with a protuberance 21 on an intermediate portion. The stop member 19 is adapted to be swung into the bore of the stem 5 for engagement with the upper end of the plunger rod 7 for limiting the upward sliding movement of said plunger rod and the ejector plate 12 when it is desired to measure a comparatively small quantity of ice cream. The stop member 19 is provided with an extension 22 on its pivoted end with which a spring 23 is engaged for normally maintaining the stop member out of the path of the plunger rod 11 to permit the dipper to be filled to its capacity when desired.

In use, the reciprocating handle 14 is moved downwardly and the inclined rods 17 function as cams to slide the arms 2 away from each other in the cross head 4 in a manner to open or spread the scoop plates 1, the ejector plate 12, of course, being shifted to the lower end portions of the scoop plates. The scoop plates are then forced into the ice cream and the handle 14 is raised in a manner to elevate the ejector plate 12 relative to the scoop plates and to move said scoop plates toward each other through the medium of the cam rods 17 and the arms 2, as will be understood. To deposit the ice cream in a carton or other container the reciprocating handle 14 is again moved downwardly relative to the tube 5 and the scoop plates 1 are again moved apart and the ice cream is stripped therefrom by the ejector plate 12 in an obvious manner. It will be noted that the scoop plates 1 are of a shape conforming substantially to the shape of a conventional ice cream carton.

While the device is particularly intended for dipping ice cream, the same may, of course, be used for any material for which the same may be found adapted and desirable.

It is believed that the many advantages of an ice cream dipper constructed in accordance with this invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. An ice cream dipper of the character described comprising a tubular stem, a tubular cross head on one end of the stem, a pair of complementary scoop plates, arms on the scoop plates extending slidably into the cross head and having openings in their inner end portions, a plunger rod disposed for reciprocation in the stem and extending downwardly therefrom through the cross head, an ejector plate fixed on the lower end portion of the plunger rod and operable between the scoop plates, a reciprocating handle fixed on the upper end of the plunger rod, and outwardly diverging cam rods extending slidably through the cross head and through the openings in the arms and having their ends anchored to the ejector plate and to the reciprocating handle, the stem having diametrically opposite slots therein, the reciprocating handle being operable in said slots, the cross head having oppositely disposed slots in its upper and lower sides, the cam rods being operable in the slots of said cross head, the slots in the stem communicating, at their lower ends, with the uppermost slot in the cross head, a handle fixed on the other end of the stem, and means on the stem engageable with the plunger rod for limiting the sliding movement of said plunger rod in one direction in the stem.

2. An ice cream dipper of the character described comprising a tubular stem, a tubular cross head on one end of the stem, a pair of complementary scoop plates, arms on the scoop plates extending slidably into the cross head and having openings in their inner end portions, a plunger rod disposed for reciprocation in the stem and extending downwardly therefrom through the cross head, an ejector plate fixed on the lower end portion of the plunger rod and operable between the scoop plates, a reciprocating handle fixed on the upper end of the plunger rod, and outwardly diverging cam rods extending slidably through the cross head and through the openings in the arms and having their ends anchored to the ejector plate and to the reciprocating handle, the stem having diametrically opposite slots therein, the reciprocating handle being operable in said slots, the cross head having oppositely disposed slots in its upper and lower sides, the cam rods being operable in the slots of said cross head, the slots in the stem communicating, at their lower ends, with the uppermost slot in the cross head, a handle fixed on the other end of the stem, and means on the stem engageable with the plunger rod for limiting the sliding movement of said plunger rod in one direction in the stem, the last named means comprising a stop member pivotally mounted on the stem for swinging movement into said stem in the path of the plunger rod for abutting engagement therewith.

3. In a dipper, a pair of opposed blades, a tubular stem provided at one end with a tubular cross head, arms on the blades extending into the cross head, said cross head being longitudinally slotted, and said arms adjacent their free ends being provided with openings, a plunger rod reciprocable within said stem, an ejector plate fixed on one end of said plunger rod and operable between said blades, said stem being longitudinally slotted, a handle on said plunger rod extending through said slots in said stem, and obliquely disposed cam rods between said handle and said ejector plate and extending through the slots in said cross head and the openings in said arms.

In testimony whereof I affix my signature.

FOREST S. RUSHAY.